United States Patent [19]

Ronnkvist

[11] 3,726,462
[45] Apr. 10, 1973

[54] ROD WELDING APPARATUS FOR MAKING THREADED DRILL RODS

[75] Inventor: Ake E. Ronnkvist, Excelsior, Minn.

[73] Assignee: E. J. Longyear Company, Minneapolis, Minn.

[22] Filed: Oct. 26, 1970

[21] Appl. No.: 83,899

[52] U.S. Cl. ........................228/6, 29/464, 29/484, 214/1 P, 219/59, 228/9, 228/45, 228/48
[51] Int. Cl. ..............................................B23k 5/00
[58] Field of Search......................219/60 A, 85, 59, 219/60; 214/2.5, 1 P; 113/116 UT, 116 DD; 29/464, 484; 228/4, 15, 17, 45, 48, 25, 9

[56] References Cited

UNITED STATES PATENTS

| 1,907,702 | 5/1933 | Anderson | 228/48 X |
| 3,108,699 | 10/1963 | Auschutz | 214/1 P |
| 3,521,020 | 7/1970 | Fiedler et al. | 219/60 R |
| 3,614,077 | 10/1971 | Blackburn | 228/48 X |
| 2,819,379 | 1/1958 | Wiley et al. | 219/62 |

Primary Examiner—J. Spencer Overholser
Assistant Examiner—Robert J. Craig
Attorney—Dugger, Peterson, Johnson & Westman

[57] ABSTRACT

Rod welding apparatus that includes a rod positioner and a chuck assembly mounted on opposite ends of a frame for movement toward and away from one another, a plurality of roller assemblies intermediate the first mentioned assemblies for supporting a pair of rod portions with a threaded together pin and box combination intermediate the rod portions, a hold down assembly having driven rollers to releasably hold the rod portions down on the roller assemblies and rotate the rod portions and said combination while the rod portions and combination are held in axial compression by the first mentioned assemblies, a welder machine, a seam locator unit and controls for welding the pin to one rod portion and the box to the other rod portion, and a linear travel assembly for moving the rod portion adjacent the rod positioner assembly toward the chuck assembly, and the method of welding the rod portions together.

32 Claims, 14 Drawing Figures

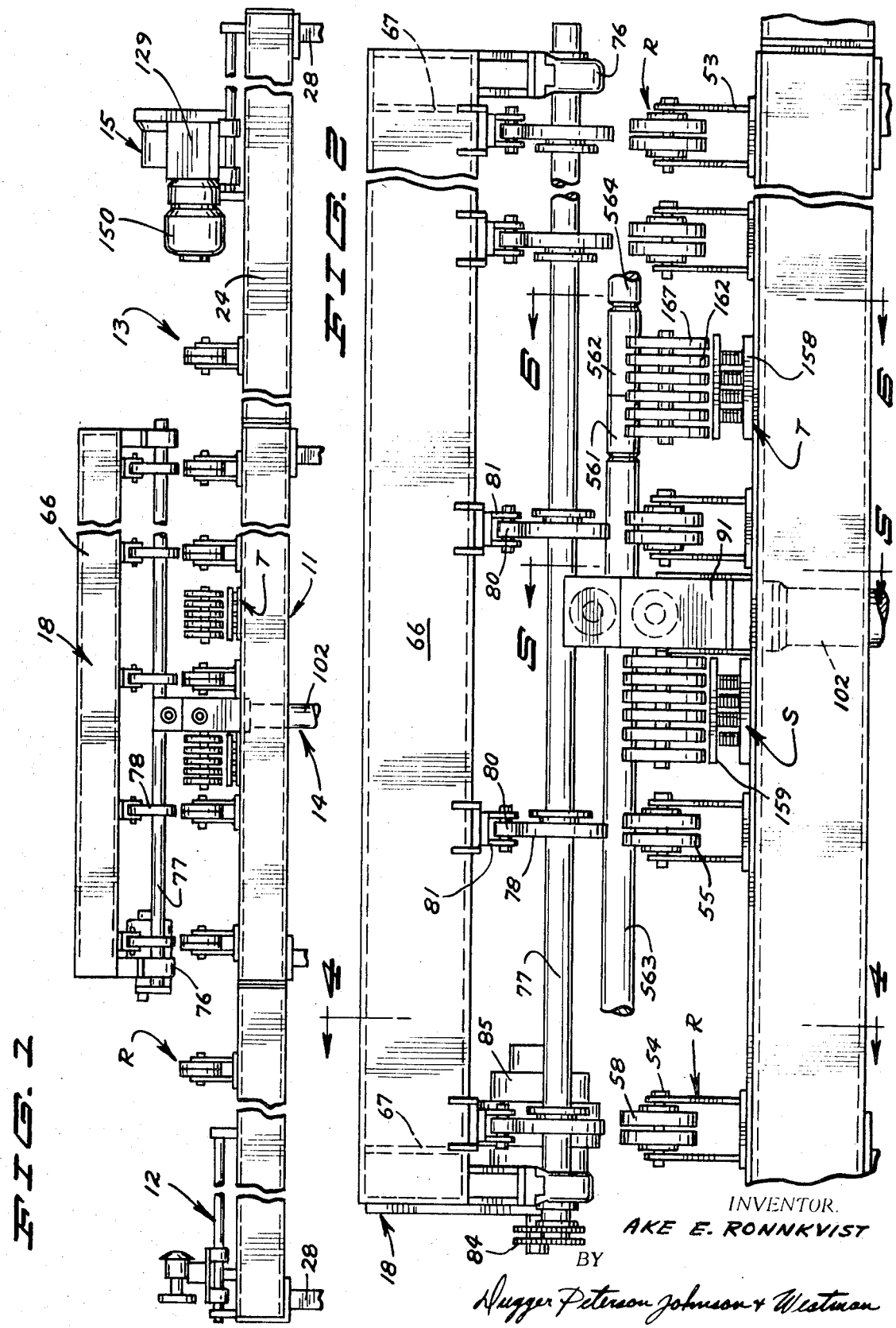

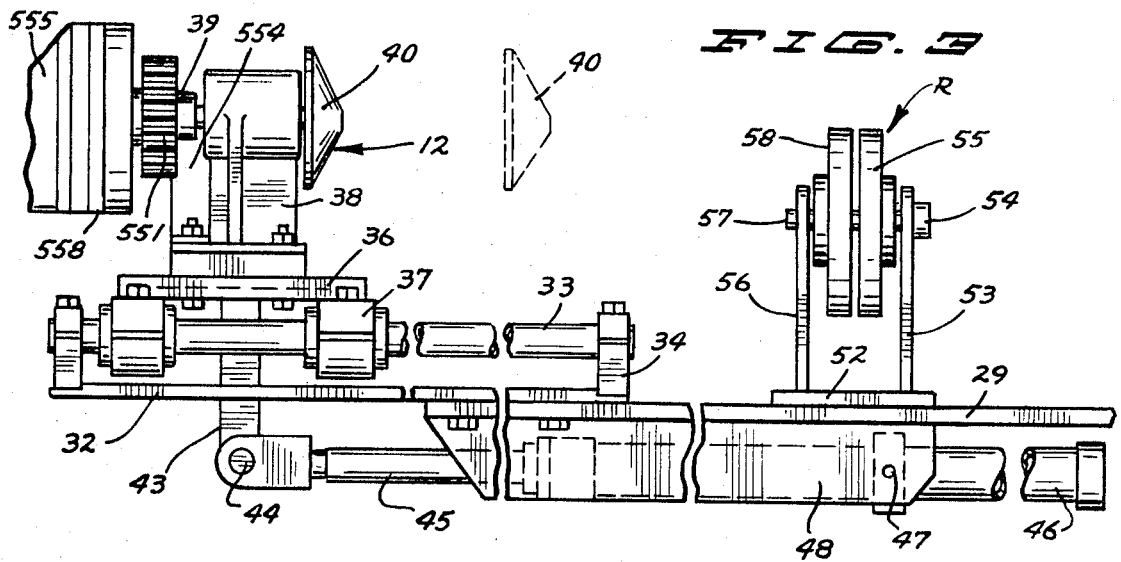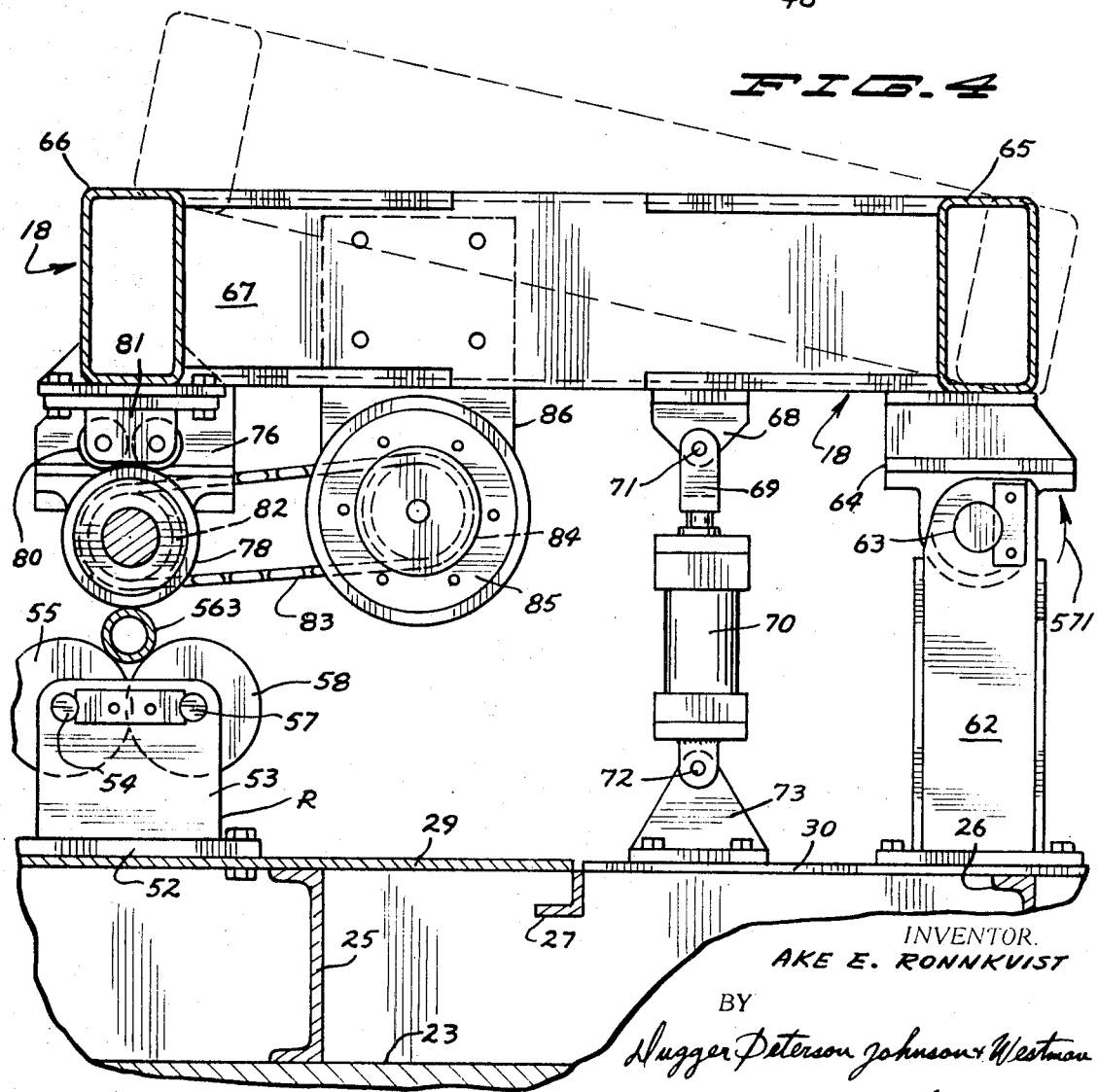

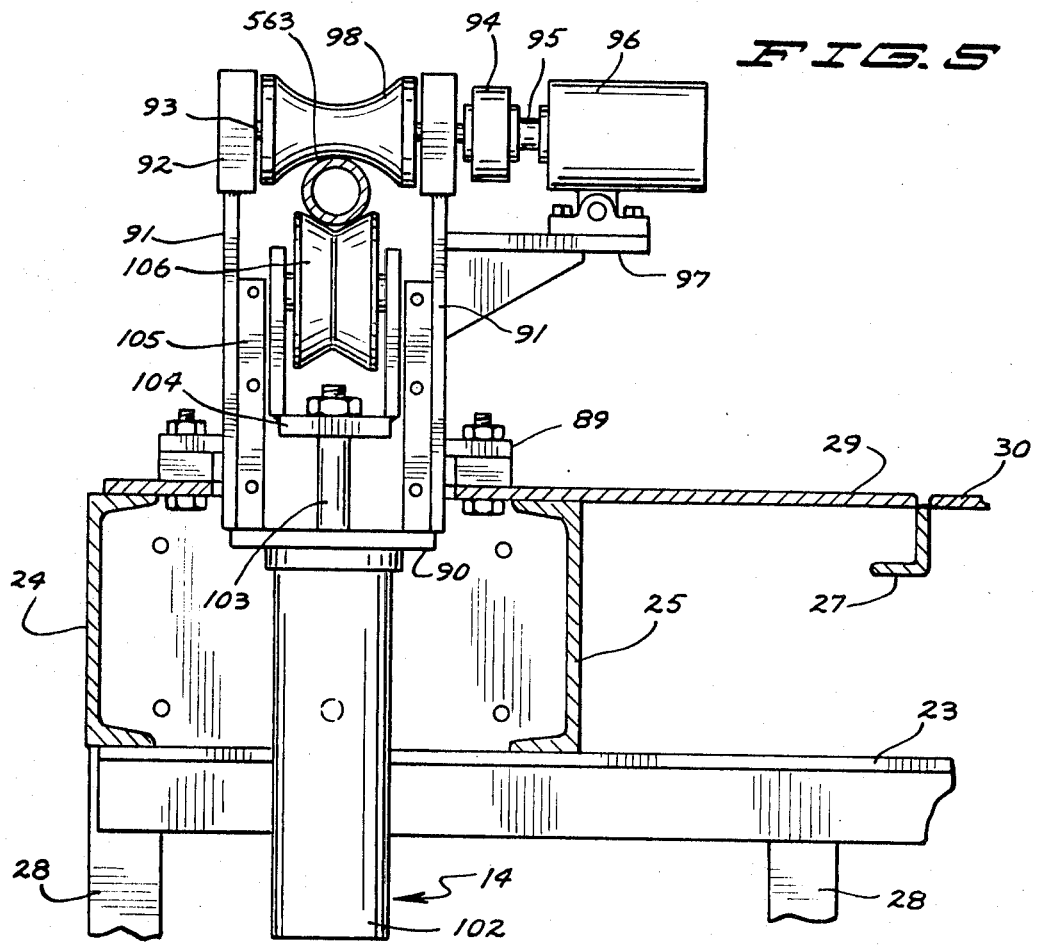
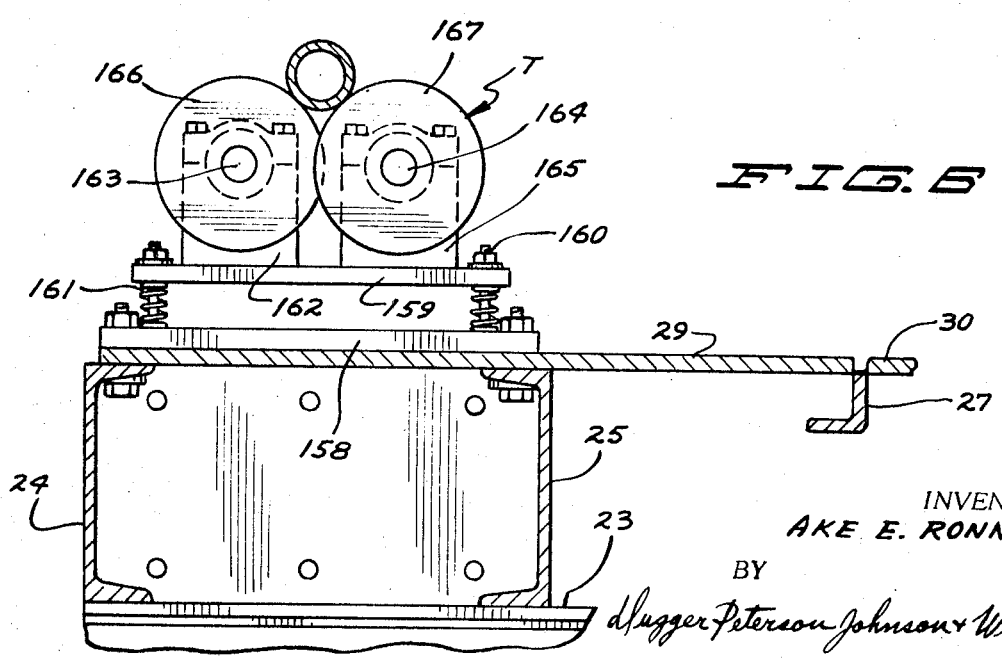

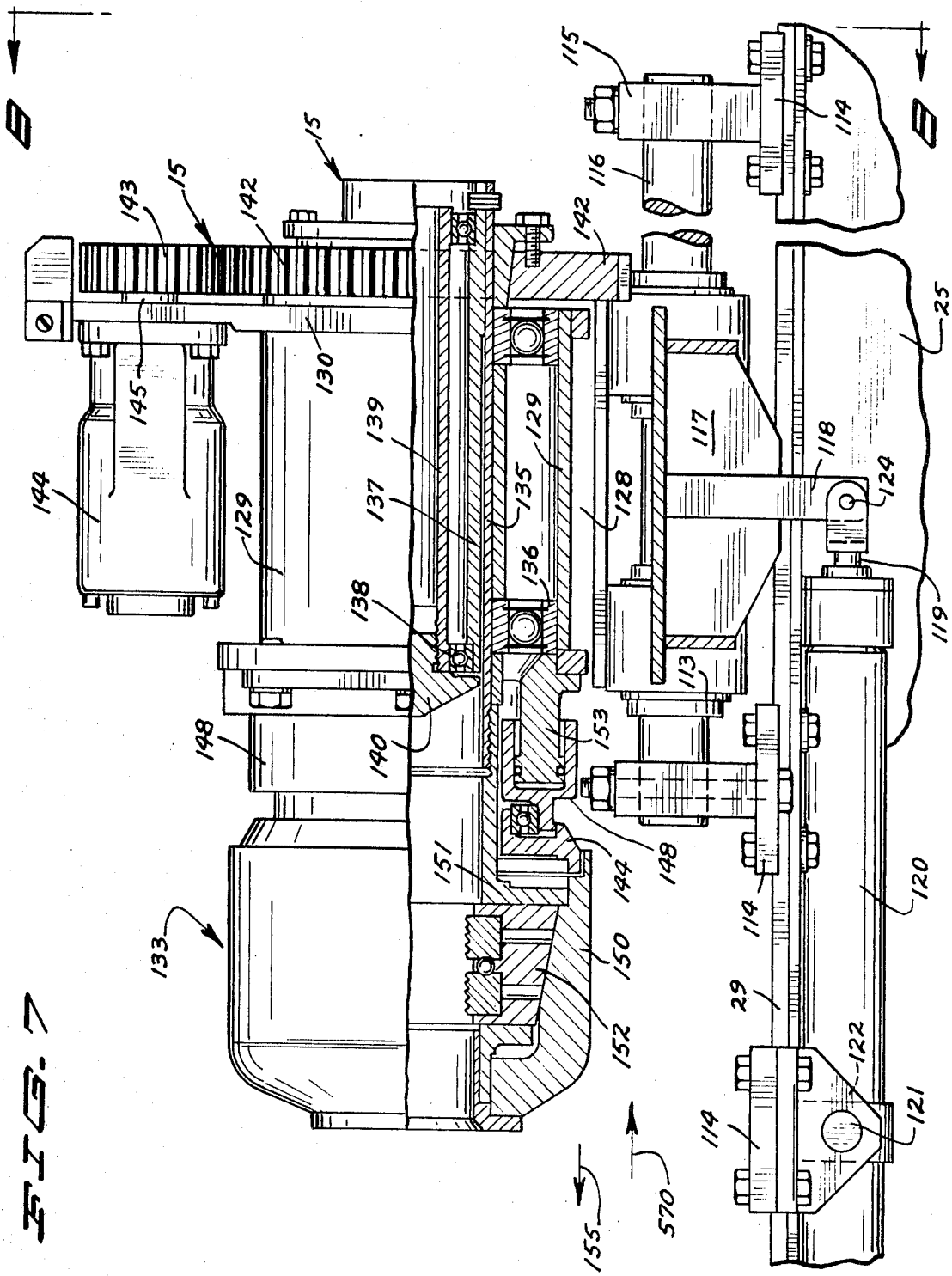

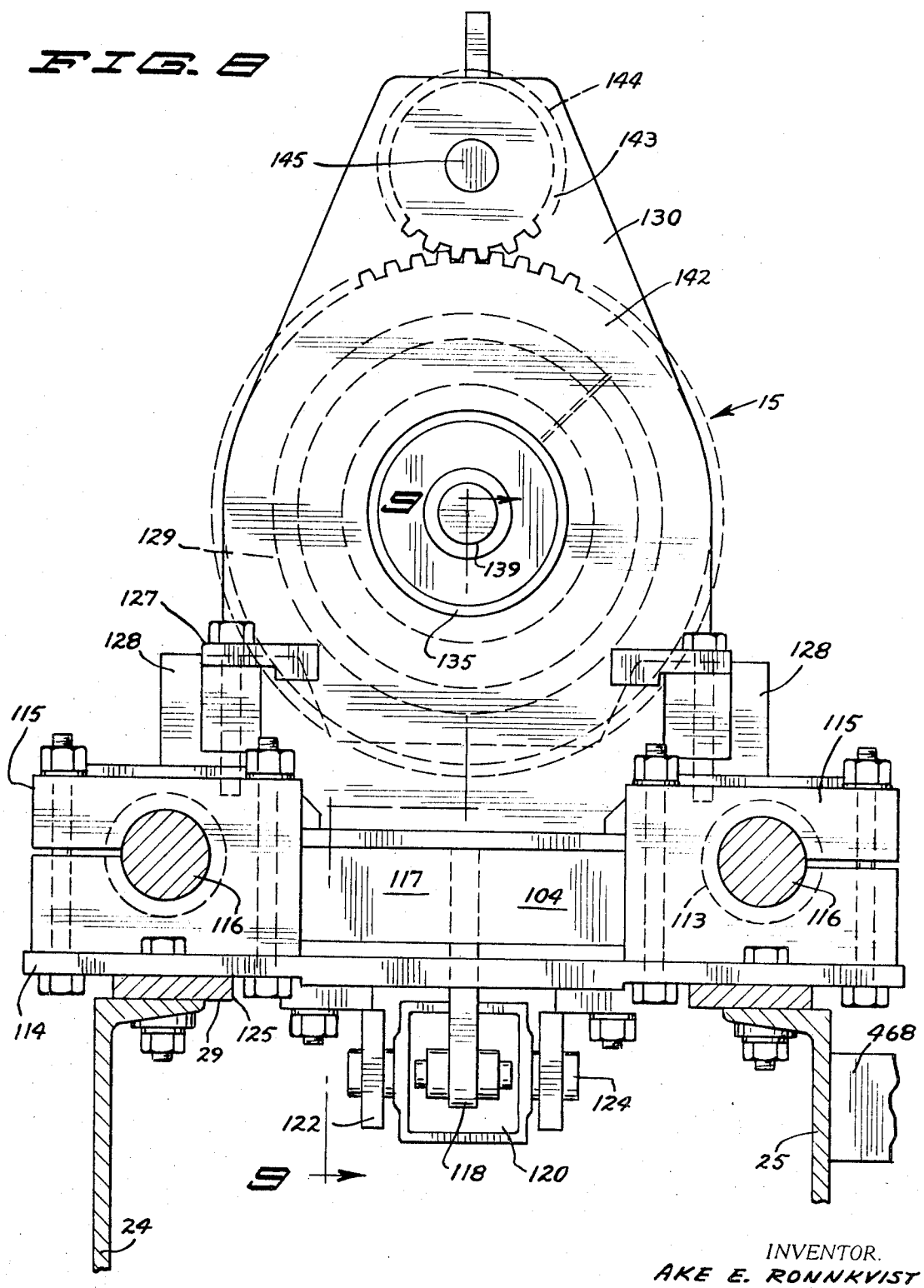

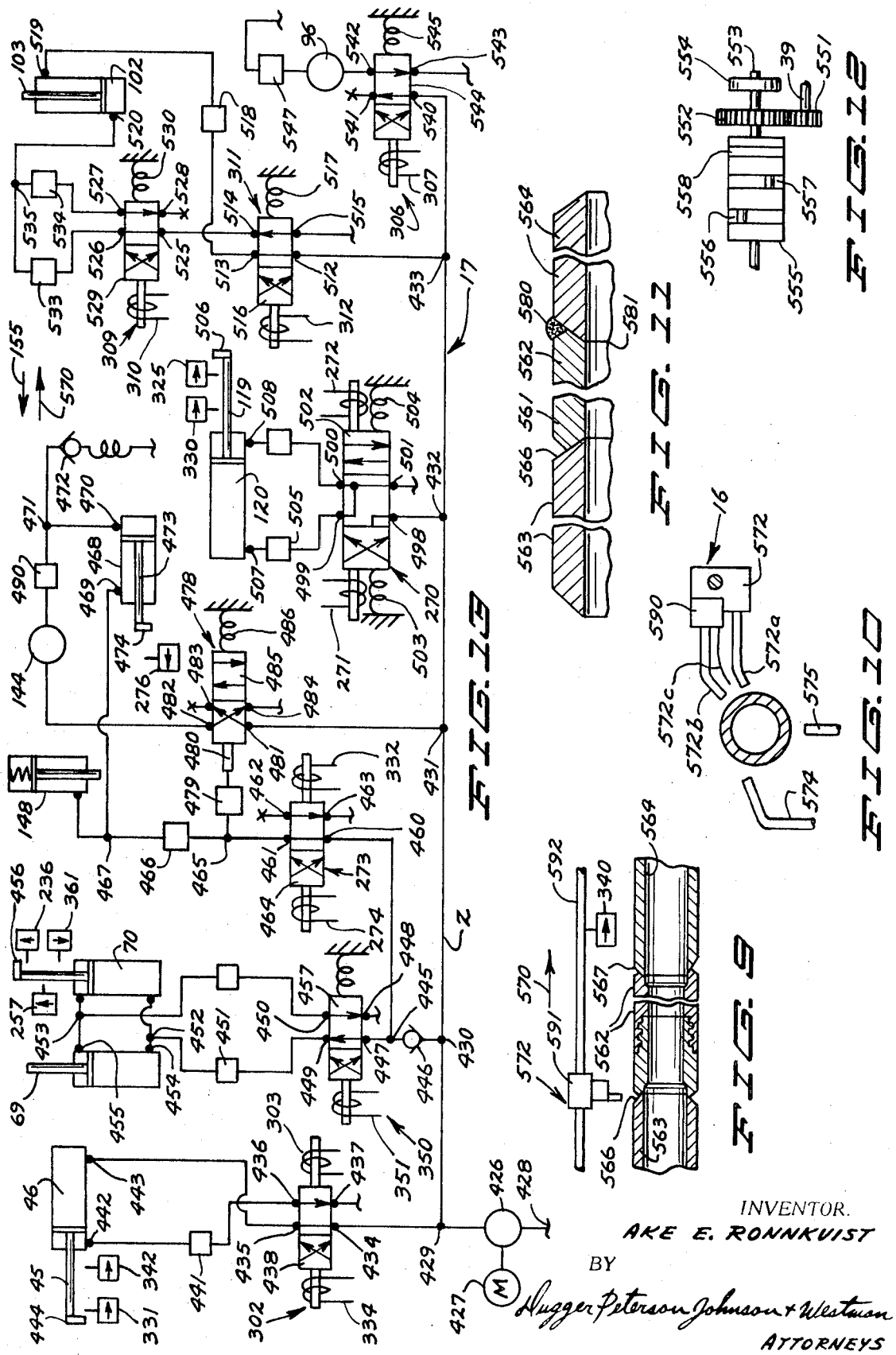

ROD WELDING APPARATUS FOR MAKING THREADED DRILL RODS

The chuck disclosed in this application is more fully disclosed in the copending application, Ser. No. 81,697, filed Oct. 19, 1970, now U.S. Pat. No. 3,692,320, of Leonard A. Lindelof and Albert L. Linn and entitled "Chuck Apparatus" while the drill rod formed is disclosed in the application of John F. Hoffmeister entitled "Composite Rods" which is Ser. No. 84,001, filed the same day as this application this latter application being commonly assigned to the assignee of this application.

BACKGROUND OF THE INVENTION

This invention relates to rod welding apparatus for supporting rod portions in axial alignment with a pin and box combination and welding the pin to one rod portion and the box to another rod portion. In the prior art it is old to machine an integrally formed rod blank to provide a pin portion on one end and a box portion on the other end. However, in order to have the pin and box portions of adequate strength, the rod blank is more expensive than necessary and requires a higher quality steel for the major portion of the length of the rod than is necessary. In order to overcome problems of the above mentioned nature, as well as providing a method and apparatus for making drill rods from separately processed pin, box and intermediate rod portions, and overcoming other problems, this invention has been made.

SUMMARY OF THE INVENTION

The invention includes rod welding apparatus having a cradle assembly for supporting rod portions, a pin and a box in axial alignment, reciprocally movable rod positioner and chuck assemblies for holding the rod portions, pin and box in axial compression, a rod hold down assembly for releasably holding the rod portions down on the cradle assembly, and a welding machine for welding a pin and a box to opposite ends of a rod portion.

One of the objects of this invention is to provide new and novel apparatus for welding a pin and a box to opposite ends of a rod portion and a novel method for doing so. In furtherance of the above mentioned object, it is a further object of this invention to provide new and novel apparatus to retain a pin and box in axial alignment with rod portions and welding the pin and box to the rod portions while rotating the pin, box and rod portions.

Another object of this invention is to provide new and novel apparatus and method for holding rod portions and a threaded together pin and box combination in axial compression with said combination between the rod portions while welding the pin to one rod portion and the box to the other rod portion and thence unthreading the threaded connection between the pin and box. In furtherance of the above mentioned object, it is another object of this invention to provide new and novel apparatus to selectively releasably hold a rod portion against axial and angular movement and alternately move the rod portion axially.

Although it is not essential, it is preferable that the rod portions have a smaller wall thickness than most of the axial length of the non-threaded parts of the pin and box combination and be of lower quality steel than said combination, and that the pin and box each have tapered surfaces at their non-threaded ends that are at least in part of an opposite taper from that of surfaces of the ends of the rod portions to which they are to be welded to, such as more fully described in the above mentioned application entitled "Composite Rods."

BRIEF DESCRIPTION OF THE DRAWINGS

FIG. 1 is a side view of the apparatus of this invention with various longitudinally intermediate portions being broken away;

FIG. 2 is an enlarged fragmentary side view of the central longitudinal portion of the apparatus shown in FIG. 1;

FIG. 3 is an enlarged side view of the rod positioner assembly, said view showing the live center member in solid lines in a rod receiving position, and in dotted lines in a rod compress position;

FIG. 4 is a transverse cross sectional view generally taken along the line and in the direction of arrows 4—4 of FIG. 2, said view showing the rod hold down assembly in a rod hold down position in solid lines and in an elevated rod release position in dotted lines;

FIG. 5 is a fragmentary enlarged transverse cross sectional view generally taken along the line and in the direction of arrows 5—5 of FIG. 2 to more clearly illustrate the linear travel and rod clamp assembly;

FIG. 6 is an enlarged fragmentary transverse cross sectional view generally taken along the line and in the direction of the arrows 6—6 of FIG. 2 to more clearly illustrate the mounting of the cradle rollers that are adjacent the rod clamp assembly;

FIG. 7 is an enlarged side view of the chuck travel assembly, the portion of the view of the chuck mechanism shown in cross section being generally taken along the line and in the direction of the arrows 7—7 of FIG. 8;

FIG. 8 is an end view of the chuck travel assembly, said view being generally taken along the line and in the direction of the arrows 8—8 of FIG. 7;

FIG. 9 is in part a schematic showing of a seam locator unit, a welder head unit mounted on the locator unit, and an illustration of a threaded together pin and box combination between parts of rod portions that are to be welded thereto;

FIG. 10 is a transverse schematic showing of the units of FIG. 9, a post welding heater and a drill stem rod part;

FIG. 11 is a fragmentary enlarged view of the adjacent parts of rod portions, pin and box of FIG. 9 in positions to have the pin welded to one rod portion and the box to the other rod portion;

FIG. 12 is a fragmentary plan view of the control mechanism for operating limit switches that in part control the start and stop of the welding;

FIG. 13 is a schematic showing of the hydraulic circuitry and components of the apparatus of this invention.

Figure 14:
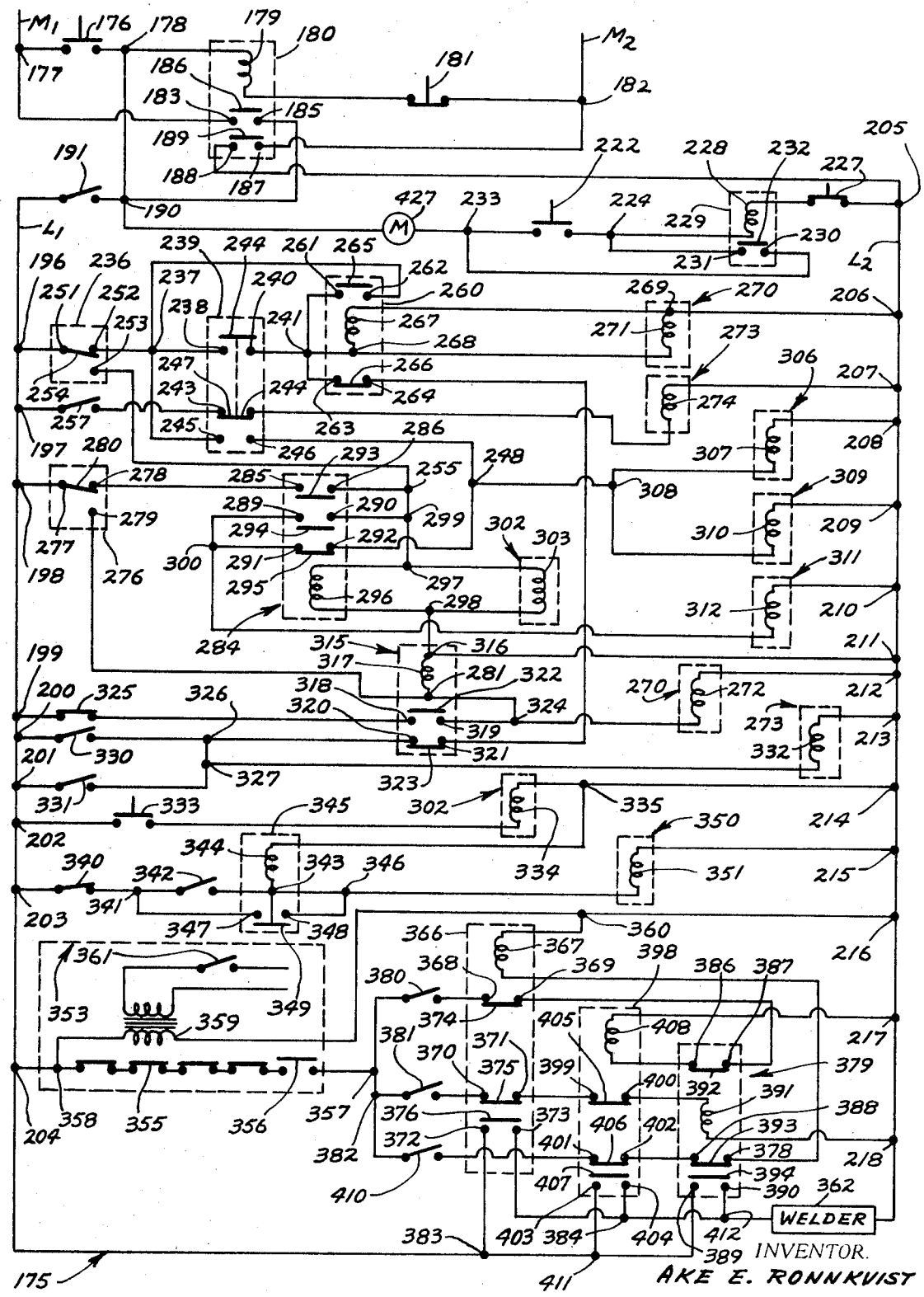
FIG. 14 is a schematic showing of the electric circuitry and components of the control mechanism.

Referring now in particular to FIG. 1, the apparatus of this invention includes a longitudinally elongated frame, generally designated 11, a rod positioner assembly, generally designated 12, mounted at the forward end portion of the frame; a chuck travel assembly, generally designated 15, mounted on the rearward end portion of the frame; a cradle assembly, generally designated 13, mounted on the frame intermediate assemblies 12 and 15; a rod hold down assembly, generally designated 18, mounted on the longitudinally intermediate portion of the frame; a linear travel and rod clamp assembly, generally designated 14, mounted on the frame beneath the rod hold down assembly; a rod welder machine, generally designated 16, mounted on the frame adjacent assembly 14, hydraulic control mechanism, generally designated 17 (see FIG. 13), and electric control mechanism, generally designated 175 (see FIG. 14). Referring now in particular to FIGS. 1 and 4–6, the frame includes a plurality of longitudinally elongated, transversely spaced channels 24, 25 and 26 that are mounted on a generally horizontal support member 23 to extend thereabove; the support member being mounted on a plurality of spaced uprights 28. Mounted on the channels 24, 25 to extend the length thereof is a mounting plate 29, the edge of the mounting plate opposite channel 24 being welded to a longitudinally elongated channel 27. Also, one longitudinal edge of a support plate 30 is welded to channel 27 while the opposite edge is attached to channel 26. It is to be understood that each of the above mentioned channels and plates may be made up of a plurality of members having adjacent ends joined together.

The rod positioner assembly 12 includes a longitudinally elongated, horizontal plate 32 bolted to the forward end portion of plate 29 to extend forwardly thereof (see FIG. 3). A pair of longitudinally elongated, transversely spaced slide shafts 33 have their end portions mounted by shaft supports 34 which in turn are mounted by plate 32 to support the shafts vertically spaced above said plate 32. The generally rectangular base 36 of a live center assembly has each of its corner portions attached to base side members 37, two of the base slide members being mounted on one of the shafts 33 and the other two being mounted on the other shaft 33. A support member 38 is bolted to the base 36 for rotatably mounting a longitudinally extending shaft 39 a substantial distance vertically above base 36. The rear end of shaft 39 mounts a generally frusto-conical live center member 40 having a minor base extending rearwardly of said shaft and support member 38, the forward end of the shaft having a sprocket 551 keyed thereto.

A vertical bar 43 is dependingly secured to the central portion of base 36, the lower end of the bar mounting the transverse pivot member 44 which in turn pivotally mounts the one end of the piston rod 45 of the piston cylinder combination 46. The aforementioned piston cylinder combination includes a cylinder 46 that has its intermediate portion mounted by a transverse pivot member 47. Pivot member 47 is mounted by a pair of longitudinally extending brackets 48 (one on either side of the cylinder) that are dependingly secured to plate 29. Both plates 29 and 32 have longitudinally elongated slots (not shown) to permit the bar being moved therethrough throughout the length of the piston rod stroke.

The cradle assembly 13 includes a pair of roller assemblies R mounted intermediate the positioner assembly and the rod hold down assembly, one of said roller assemblies being shown in FIG. 3 and the other being shown in FIG. 1, as well as additional roller assemblies R. Since each of the aforementioned roller assemblies is of the same construction as the roller assembly R illustrated in FIG. 4, the roller assemblies will be described with reference to the roller assembly illustrated in FIG. 3 and the roller assembly illustrated in FIG. 4. Each roller assembly R includes a base 52 secured to the plate 29, longitudinally spaced uprights 53, 56 that are mounted by the base 52, transversely spaced shafts 54, 57 having their one ends mounted by upright 53 and their opposite ends mounted by upright 56, a roller 55 rotatably mounted on shaft 54 and a roller 58 rotatably mounted on shaft 57. The shafts 54, 57 are mounted at the same elevation while the rollers are of the same diameters, of substantially larger diameters than the rod portion to be supported thereby, and are mounted such that, as viewed in FIG. 4, they in part transversely overlap one another, but are longitudinally adjacent one another. Thus, the rollers provide a nip for rotatably supporting a rod portion and resist transverse movement of the rod portion. The rollers 55, 58 support a rod portion at an elevation that the axis of rotation of the rod portion is aligned with the center of the frusto-conical portion of the live center member 40.

Referring now to FIGS. 2 and 4, the rod hold down assembly 18 includes a pair of uprights 62 mounted on plate 30 above frame member 26, each upright mounting a longitudinal, horizontal pivot member 63 which in turn pivotally mounts a bracket 64. Each bracket mounts the adjacent end of a longitudinal channel 65, the one ends of a pair of spaced transverse channels 67 being secured to the adjacent ends of the channel 65. The opposite ends of the channels 67 mounts a longitudinal channel 66. To the transverse intermediate portion of each channel 67 there is dependingly mounted a bracket 68, the piston rod 69 of a piston cylinder combination 69, 70 being pivotally connected by a transverse pivot member 71 to the respective bracket 68. Each of the aforementioned piston cylinder combinations includes a cylinder 70 that is pivotally connected by a transverse pivot member 72 to a bracket 73 that in turn is mounted by plate 30.

Each end of the channel 66 dependingly mounts a bearing member 76 which in turn rotatably mounts a shaft 77 to extend parallel to said channel. On the shaft, intermediate the bearing members 76, there is keyed a plurality of axially spaced rollers 78. In the assembly 18 rod hold down position, each roller 78 is located directly above a roller assembly R to have the lowermost portion of the roller 78 located directly above the nip formed by rollers 55, 58. The uppermost circumferential portion of each roller 78 bears against a pair of transversely spaced rollers 80 that are rotatably mounted by a clevis bracket 81 for rotation about a longitudinal axis. Each bracket 81 is dependingly mounted by the channel 66. Rollers 80 prevent the adjacent roller 78 from being moved to a different elevation than the axially adjacent rollers 78 as a result of shaft 77 bowing if rollers 80 were not provided.

On the forward end of shaft 77 there is keyed a sprocket 82, a chain 83 being extended around sprocket 82 and sprocket 84 to impart a driving rotary motion to the shaft. Sprocket 84 is keyed to the motor shaft of the hydraulic motor 85 which in turn is dependingly mounted from the front channel 67 by a bracket 86.

Referring to FIGS. 1, 2 and 5, longitudinally intermediate the length of channel 66, the linear travel and rod clamp assembly 14 is mounted by plate 29. Assembly 14 includes a generally U-shaped bracket having a web portion 90 located at a lower elevation than plate 29 and transversely spaced legs 91 having their lower ends joined to the web portion to extend upwardly through an appropriate aperture in plate 29 to a substantially higher elevation than said plate. Tabs 89 are welded to legs 91 and are bolted to plate 29 to hold bracket 90, 91, 91 in a fixed position. The upper ends of the legs mount bearing members 92 which in turn rotatably support the transverse shaft extension 93 that is coupled at 94 to the motor shaft 95 of the hydraulic motor 96. The motor 96 is mounted on the bracket 97 which in turn is mounted by adjacent leg 91. Keyed to the shaft extension 93 intermediate bearing members 92 is a roller 98, roller 98 being of a minimum diameter intermediate its opposite axial ends and being of progressively increasing diameters toward the ends thereof to provide a concave circumferential surface such as shown in FIG. 5.

Dependingly mounted by web 90 in a fixed position is a cylinder 102 of a vertical piston cylinder combination 102, 103. The piston rod 103 of the aforementioned combination is slidably extended through an appropriate central aperture in the web 90 and at its upper end mounts a clevis bracket 104. Each leg portion of the bracket 104 mounts a roller (not shown) that extends into the vertical groove (not shown) of the adjacent leg 91. The aforementioned guides, and the rollers that are rotatably mounted in the guides, insure that the bracket 104 moves in a vertical direction as the piston rod 103 is reciprocated between its extended position of FIG. 5 and it retracted position. The upper ends of the legs of the bracket 104 mount a roller 106 for rotation about a transverse axis, the roller 106 having two frusto-conical half portions that are joined together at their minor bases. It is to be noted that the axis of rotation of roller 106 is directly beneath and parallel to the axis of rotation of roller 98; the spacing of roller 98 and roller 106 in its maximum elevation being such to clamp a rod therebetween to prevent the rod being moved either axially, transversely or being rotated. The minimum diameter parts of rollers 98, 106 are located in a vertical plane that passes through the nips of rollers 55, 58.

Referring now to FIGS. 7 and 8, the chuck travel assembly 15 includes a pair of transversely spaced, longitudinally extending guide rods 116, each end of each guide rod being mounted by a bracket 115. The front brackets are mounted by a transverse support 114 while the rear brackets are mounted by a second support 114. The supports 114 are mounted by plate 29. Mounted for slidable movement by rods 116 are slide rings 113 which in turn mount the base 117. The base mounts a vertical bar 118 that extends through a longitudinally elongated slot 125 provided in plate 29. The lower end of the bar is pivotally connected at 124 to the piston rod 119 of the piston cylinder combination 119, 120. The intermediate portion of the cylinder 120 of the aforementioned combination is mounted for limited pivotal movement about a transverse axis by pivot member 121, pivot member 121 being pivotally mounted by bracket members 122 which in turn are dependingly secured to the front support 114 that has opposite ends mounted by plate 29 on opposite sides of slot 125.

Support members 128 which are mounted on the base 117 mount housing mounting mechanism 127 which in turn mounts a generally annular housing 129 having a central longitudinal axis aligned with the axis of rotation of live center member 40. The housing at its rear end is secured to and extends through an aperture in a vertical, transverse support plate 130 while the opposite end of the housing opens to the hydraulic chuck annular piston 153. The piston 153 and housing have adjacent flange portions that are bolted together whereby the chuck is mounted by the housing. The housing mounts bearing members 136 which in turn rotatably mounts the rod drive tube 135. Within tube 135 there is mounted a live center tube 137 to rotate therewith, tube 135 mounting bearings 138 that in turn mount the idler tube 139 for rotation relative tube 135. The forward end portion of tube 139 mounts a generally frustoconical cone idler (live center member) 140 to rotate with tube 139, the idler extending axially into the center opening of the annular piston 153.

The live center tube 137 and rod drive tube 135 are keyed together, a sprocket member 142 being clamped to the rear end portion of the live center tube for driving the live center tube. Sprocket 142 is driven by a smaller diameter sprocket 143 which is keyed to the motor shaft 145 of the hydraulic motor 144, the motor being mounted on the upper end portion of support plate 130 and having its shaft rotatably extended therethrough.

Even though the chuck 133 illustrated in the drawings does not per se form a part of this invention, it will be briefly described in order to more readily facilitate the understanding of this invention. The chuck includes the aforementioned annular piston 153 which slidably extends into the annular chamber of the cylinder 148, a bearing being mounted by the cylinder and the annular thrust plate 149 to permit relative rotation between the bearing and thrust plate. A chuck hood 150 is mounted by a chuck body 151, the chuck body in turn having an end portion mounted by the rod drive tube to rotate therewith. The chuck body mounts a plurality of circumferentially jaws 152 for slidably radial movement, the jaws being retained in a rod clamping position by the chuck body when the piston 153 and cylinder 148 are in their relative retracted positions as shown in FIG. 7. Resilient means (not shown) are mounted by the chuck body and chuck hood to resiliently retain them in relative positions that the jaws are in rod clamping position; however, upon applying fluid to the cylinder, the cylinder is moved axially in the direction of the arrow 155 relative to the piston to move the chuck hood in the same direction relative the chuck body. As a result the jaws are free to move and are resiliently moved radially outwardly from a rod clamping position; the chuck hood being resiliently returned to the FIG. 7 position through the action of the resilient means (not shown) upon the pressurized fluid in the cylinder being permitted to exhaust therefrom.

Through the structure above described, the chuck body and chuck hood are free to rotate relative the piston 153 and cylinder 148 and the housing 129; but at the same time are mounted to be moved axially by the housing. In this connection, the chuck body is mounted to be in a fixed axial position relative the housing as long as the housing is rotated in the appropriate direction.

Mounted longitudinally intermediate the roller assemblies mounted beneath the rod hold down assembly and the chuck travel assembly are one or more roller assemblies R.

Mounted directly beneath the longitudinally central portion of channel 66 in its rod clamp position is a roller assembly, generally designated T (see FIGs. 2 and 6). The roller assembly T includes a base plate 158 abutting against plate 29 and bolted to channels 24, 25, and a horizontal support plate 159 that is vertically slidably mounted on bolts 160 that have nuts threaded thereon to limit the upper movement of the support plate relative the base plate. The bolts 160 are secured in the base plate, there being provided coil springs 161 on the bolts intermediate plates 158, 159 for resiliently urging plate 159 in an upward direction. A pair of shaft supports 162 are mounted on one transverse side portion of the base plate to mount a shaft 163, a plurality of spaced rollers 166 being rotatably mounted on said shaft. On the opposite transverse portion of the base plate there is mounted a second pair of shaft supports 165 which in turn mounts a shaft 164; shaft 164 rotatably mounting a plurality of longitudinally spaced rollers 167. The rollers on shaft 163 are longitudinally offset from the rollers on shaft 164 with the rollers on the respective shafts being transversely close enough together to form a nip for supporting a rod portion such as described with reference to roller assemblies R.

On either longitudinal side of the roller assembly T there is provided a roller assembly R while forwardly of the forward one of the last mentioned roller assemblies R there is mounted the linear travel and rod clamp assembly 14. Just forwardly of the assembly 14 there is provided a second roller assembly, generally designated S which is of the same construction as roller assembly T.

Referring now to FIG. 14, the electrical control circuitry and components, generally designated 175, includes main lines $M_1$ and $M_2$ on which there is respectively provided junctions 177 and 182. Connected across junctions 177, 178 is a master ON-OFF switch 176 that is resiliently retained in an open position. A normally closed stop switch 181 and the solenoid coil 179 of a relay 180 are connected in series across junctions 178, 182. Relay 180 includes a first terminal 183 that is connected by a line to junction 177, a second terminal 185 connected by a line to junction 190, a switch member 186, a third terminal 188 connected to line $L_2$, a fourth terminal 187 connected to junction 182 and a switch member 189. When the relay is energized, switch member 186 moves to electrically connect terminals 183, 185; and switch member 189 moves to electrically connect terminals 187, 188.

Junction 190 is connected by lines to junctions 178, while a manually operated ON-OFF switch 191, which remains in the position it is switched to, is connected across junction 190 and main line $L_1$. On main line $L_1$ there is provided junctions 196–204, while on line $L_2$ there is provided junctions 205–218. The motor 427 (or appropriate motor starter circuitry for energizing the motor) is connected across junctions 190, 233 while a switch 222 that is resiliently retained in an open position is connected across junctions 223, 224. The coil 228 of relay 229 and a stop switch 227 resiliently retained in a closed position are connected in series across junctions 205, 224. The relay 229 has a terminal 231 connected to junction 224, a terminal 230 connected to junction 233 and a switch member 232 that electrically connects terminals 230, 231 when coil 228 is energized.

A limit switch 236 has a first terminal 251 connected to junction 196, a second terminal 252 connected to junction 237, a third terminal 253 connected to junction 255 and a switch member 254 resiliently retained in a position connecting terminals 251, 252 but movable to connected terminals 251, 253.

Junction 237 is connected by a line to a first terminal 238 of a manually operated switch 239. Switch 239 includes a second terminal 240 connected to junction 241, a third terminal 243, a fourth terminal 244, a fifth terminal 245 connected by a line to junction 237, a sixth terminal 246 connected by a line to junction 248, a switch member 242 and a switch member 247. Switch 239 is the type that its switch members remain in a given position until switched to the second position. In a first position, switch member 247 forms an electrical connection between terminals 243, 244 while switch member 242 does not form an electrical connection between any of the terminals of switch 239. In the second position, switch member 242 electrically connects terminals 238, 240 while switch member 247 breaks the electrical connection between terminals 243, 244 and electrically connects terminals 245, 246. A limit switch 257 that is resiliently retained in an open position is connected across junction 197 and terminal 243.

A relay 260 has a first terminal 261 connected by a line to junction 241, a second terminal 262 connected by a line to junction 237, a third terminal 263 connected by a line to junction 241, a fourth terminal 264, switch members 265, 266 and a solenoid coil 267 that is connected across junctions 268, 269, junction 268 being connected by a line to junction 241. When coil 267 is energized, switch member 265 moves to electrically connect terminals 261, 262 and switch member 266 moves to break the electrical connection between terminals 263, 264. A solenoid coil 271 of the solenoid operated valve 270 is connected across junctions 268, 269, junction 269 being connected to junction 206. A solenoid coil 274 of the solenoid operated valve, generally designated 273, is connected across relay terminal 244 and junction 207.

A limit switch 276 has first, second and third terminals 277, 278, 279 and a switch member 280 that is resiliently retained in a position to electrically connect terminals 277, 278 but that is movable to break the aforementioned connection and electrically connect terminals 277, 279. Terminal 277 is connected by a line to junction 198, terminal 279 is connected by a line to junction 281, and terminal 278 is connected by a line to the first terminal 285 of a solenoid relay 284. Relay 284 includes a second terminal 286 and a fourth terminal 290 that are connected by lines to junctions 255, 299, respectively, junction 255 being connected to junction 299 which in turn is connected by a line to junction 297. Further relay 284 includes a third terminal 289 and a fifth terminal 291 that are connected by lines to junction 300, a sixth terminal 292 connected by a line to junction 248 which in turn is connected to junction 308, and a solenoid coil 296 connected across junction 297, 298. When the relay 284 is energized, switch member 293 electrically connects terminals 285, 286; switch member 294 electrically connects terminal 289, 290; and switch member 295 breaks the electrical connection between terminals 291, 292. A solenoid coil 303 of a solenoid operated valve, generally designated 302, is connected across junctions 297, 298. A solenoid operated valve, generally designated 306, has a solenoid coil 307 connected across junctions 208, 308 while a solenoid operated valve 309 has a solenoid coil 310 connected across junctions 209 and 308. A solenoid operated valve, generally designated 311 has a solenoid coil 312 connected across junctions 210, 300.

A relay 315 has a solenoid coil 317 connected across junctions 316 and 281, junction 316 being connected to junctions 211, 298, a first terminal 318, a second terminal 319, a third terminal 320, a fourth terminal 321, a switch member 322 and a switch member 323. Upon energization of the coil 317, switch member 322 electrically connects terminals 318, 319 while switch member 323 breaks the electrical connection between terminals 320, 321. Terminal 319 is connected by a line to junctions 324 and 281 while a limit switch 325, resiliently retained in a closed position, is connected across junction 199 and terminal 318. Coil 272 of the solenoid operated valve 270 is connected across junctions 324, 212. Terminal 321 is connected by a line to terminal 264 of relay 260 while terminal 320 is connected by a line to junctions 326 and 327. A limit switch 330, resiliently retained in an open position, is connected across junctions 200, 326 while a limit switch 331 that is resiliently retained in an open position is connected across junctions 201, 327. The second solenoid coil 332 of valve 273 is connected across junctions 327, 213.

A manually operated switch 333 which is resiliently retained in an open position and a second solenoid coil 334 of valve 302 are connected in series across junctions 202 and 335. Junction 335 is connected by a line to junction 214.

A limit switch 340, resiliently retained in a closed position, is connected across junctions 203, 341 while a limit switch 342, resiliently retained in an open position, is connected across junctions 341, 343. The solenoid coil 344 of a relay 345 is connected across junctions 343, 335, junction 343 being connected by a line to junction 346. Relay 345 also includes a first terminal 347 connected by a line to junction 341, a second terminal 348 connected by a line to junction 346 and a switch member 349 that is movable by energization of coil 344 to a position to electrically connect terminals 347, 348. The solenoid coil 351 of the solenoid operated valve 350 is connected across junctions 346, 215.

The controls 353 of a conventional seam locator unit 572 (also see FIGS. 9 and 10) include a plurality of relays that include relay terminals and normally closed switch members 355 and relay terminals and a normally open switch member 356 that are connected in series across the junction 358 of controls 353 and the junction 357 of the machine of this invention. Further the controls 353 include one winding of a transformer 359 connected across junction 358 and a junction 360 of the machine of this invention. The transformer includes a secondary winding having a limit switch 361 that is resiliently retained in an open position; but which in a closed position actuates the automatic functioning of the seam locator unit for properly positioning the welding head 590 of the conventional welding machine 362 to carry out the welding steps. Junction 358 is connected by a line to junction 204 while junction 360 is connected by a line to junction 216. Further, the welding machine has controls connected across junctions 218, 412 that upon energization operates the welder head to weld the members that are to be welded together.

A relay 366 has a solenoid coil 367, first through sixth terminals, respectively, designated 368-373 and switch members 374-376. Upon energization of coil 367, switch member 374 breaks the electrical connection between terminals 368, 369; switch member 375 breaks the electrical connection between terminals 370, 371; and switch member 376 moves to electrically connect terminals 372, 373. The solenoid coil 367 is connected across junction 360 and the fourth terminal 378 of a relay 379. A limit switch 380 is connected across terminal 368 and junction 357 while a limit switch 381 is connected across terminal 370 and a junction 382 which in turn is connected by a line to junction 357. Limit switches 380, 381 are resiliently retained in an open condition. Terminal 372 is connected by a line to junction 383 which in turn is connected by a line to junction 204. Terminal 373 is connected by a line to junction 384.

Relay 379 also includes first, second, third, fifth and sixth terminals respectively designated 386-390, a solenoid coil 391, and switch member 392-394. When coil 391 is energized, switch member 392 breaks the electrical connection between terminals 386, 387; switch member 393 breaks the electrical connection between terminals 388, 378; and switch member 394 moves to make an electrical connection between terminals 389, 390.

A relay 398 includes first through sixth terminals respectively designated 399-404, switch members 405-407 and a solenoid coil 408 connected across junction 217 and terminal 386. When the coil 408 is energized, switch member 405 breaks the electrical connection between terminals 399, 400; switch member 406 breaks the electrical connection between terminals 401, 402; and switch member 407 moves to establish an electrical connection between terminals 403, 404. Terminal 399 is connected by a line to terminal 371; coil 391 is connected across terminal 400 and junction 218; terminal 402 is connected by a line to terminal 388; and terminals 403, 389 are connected by a line to junction 411 which is connected to junction 383. A limit switch 410 that is resiliently retained in an open position is connected across junction 382 and terminal 401. Terminals 404, 373 are connected to junction 384, junction 384 being connected by lines to junction 412 and terminal 390.

Terminal 387 is connected by a line to terminal 369. The welder head control 362 is connected across junctions 218 and 412.

Referring now to FIG. 13, the hydraulic control circuitry and components, generally designated 17, will now be described. The hydraulic controls 17 include a pump 426 driven by the motor 427, the pump pumping fluid under pressure from the sump 428 to the line Z which has junctions 429–433 thereon. Junction 429 is connected by a line to an inlet port 434 of the solenoid operated valve 302. Valve 302 has a second port 435 that is connected by a line to port 443 of cylinder 46; a third port 436 connected by a line to the pressure reducing and flow control valve 441, valve 441 in turn being connected to port 442 of cylinder 46; and a fourth port 437 that is connected to the sump. Valve 302 includes a valve member 438 that is movable to a position that port 434 is in fluid communication with port 435 and port 436 is in fluid communication with port 437 upon the energization of solenoid coil 334. The valve member is movable to a position that port 434 is fluidly connected to port 436 and port 435 to port 437 upon the energization of coil 303. Upon deenergization of the respective one of the coils 303, 334, the valve member remains in the position it is in until the other one of the coils is energized.

Mounted on the piston rod 45 is an operator 444 that with the rod in its extended position, and upon applying fluid under pressure to port 442, moves to first operate limit switch 331 and then limit switch 342.

A check valve 446 is connected between junctions 445 and 430, junction 445 being connected to the inlet port 447 of the valve 350. Valve 350 has a second port 449, a third port 450 and a fourth port 448 that is connected to the sump. Valve 350 includes a valve member 457 that is resiliently retained in a position that port 447 is fluidly connected to port 449 and port 448 is fluidly connected to port 450. When coil 351 is energized, the valve member is moved to a position to fluidly connect port 447 to port 450, and port 448 to port 449, but upon de-energization the valve member is resiliently moved to break the last mentioned fluid connections. Connected in a line between port 449 and junction 452 is a flow control 451 while a corresponding fluid control is connected in line between port 450 and junction 453. Junction 452 is connected by a line to ports 454 at the lower end of cylinders 70 while junction 453 is connected to ports 455 at the upper ends of cylinders 70. An operator 456 is secured to one of the piston rods 69 to upon the piston of cylinder moving from it lowermost position to its uppermost position, first operate limit switch 257 and thence operate limit switch 236; while when the piston rod is moved to lower operator 456, it operates limit switch 361 as will be described hereinafter.

Valve 273 includes a first port 460 connected to junction 445, a second port 461 connected to junction 465, a blocked third port 462, and a fourth port 463 that is connected to the sump. Valve 273 is of the same construction as valve 302, valve 273 including a valve member 464 that moves to, or remains in, a position upon energization of coil 332 to fluidly connect port 460 to port 461 and port 463 to port 462; while upon energization of coil 274, the valve member fluidly connects port 460 to port 462, and port 461 to port 463.

Connected across junctions 465 and 467 is a needle valve 466, junction 467 being connected to the cylinder 148 of the chuck assembly. When fluid under pressure is applied from junction 467 to the cylinder 148, the cylinder is moved relative its piston whereby the chuck hood is moved relative the chuck body to a position that the chuck jaws are resiliently moved to a non-gripping position. However, when no fluid under pressure is applied at junction 467, through spring mechanism provided in the chuck assembly, the chuck hood moves relative the chuck body to move the jaws to a rod clamping position and the cylinder is moved relative the piston to a retracted position through spring mechanism.

Junction 467 is connected to port 469 of cylinder 468 mounted on the frame adjacent assembly 15, a port 470 at the opposite end of the cylinder being connected to junction 471. The cylinder has a piston rod 473 that upon application of fluid under pressure to port 470 moves in the direction of the arrow 155, and moves in the opposite direction when fluid under pressure is applied to port 469. An operator 474 is provided on piston rod 473 for moving switch member 280 of the limit switch 276 to a position to connect terminals 277, 279 and retain the switch member in that position when the piston rod 473 has moved the maximum amount in the direction of arrow 155. Junction 471 is connected through a check valve 472 to the sump.

A needle valve 479 is connected between junction 465 and control port 480 of valve 478. Valve 478 includes an inlet port 481 connected to junction 431, a second port 482, a blocked third port 483, and a port 484 that is connected to the sump. Further valve 478 includes a valve member 485 that upon application of fluid under pressure at control port 480 moves to a position to fluidly connect port 481 to port 483, and port 482 to port 484; and that when no fluid under pressure is applied at port 480, is moved by spring member 486 to fluidly connect port 481 to port 482 and port 483 to port 484. The hydraulic motor 144 and a needle valve 490 are connected in series between port 482 and junction 471 with the needle valve being between the motor and the junction.

Valve 270 includes an inlet port 498 that is connected to junction 432, a second port 499, a third port 500, a fourth port 501 connected to the sump, and a valve member 502. Valve member 502 is movable between three positions, the neutral first position being diagrammatically illustrated in FIG. 13. In the first position, ports 499 and 500 are connected to port 501 while port 498 is blocked. In the second position, port 498 is fluidly connected to port 500 and port 499 is fluidly connected to port 501; while in the third position port 498 is fluidly connected to port 499 and port 500 is connected to port 501. When neither of the solenoid coils 271 and 272 are energized, the springs 503, 504 resiliently retain valve member 502 in its first position; however, upon energization of coil 271, the valve member is moved against the action of the spring 503 to the valve member second position. Upon energization of coil 272, valve member 502 is moved against the action of spring 504 to the valve member third position. Upon de-energization of coil 271, spring member 503 returns the valve member 502 to its first position while upon de-energization of coil 272, spring 504 returns the valve member to its first position. It is being mentioned that the control circuitry is such that both coils 271, 272 are not energized at the same time.

A flow control 505 is connected between port 499 and port 507 at one end of cylinder 120 while a second needle valve is connected between a second port 508 of said cylinder and port 500. Upon the application of fluid under pressure at port 507, the piston rod 119, if in a retracted position, is moved in the direction of arrow 570 whereby the operator 506 on the piston rod first moves switch 330 to a closed position, thence permits switch 330 opening, next operates limit switch 325 to an open position and thereafter permits the limit switch moving to a closed position.

Valve 311, which is of the same construction as valve 350, includes a first port 512 that is connected to junction 433, a second port 513, a third port 514, a fourth port 515 that is connected to the sump, a valve member 516 and a spring 517 for resiliently retaining the valve member in a position that port 512 is connected to port 513 and port 514 is connected to port 515. Upon energization of coil 312, the valve member moves to a position to fluidly connect port 512 to port 514 and port 513 to port 515. A flow control 518 is connected across port 513 and a port 519 at the upper end of cylinder 102. The port 520 at the lower end of cylinder 519 is connected to junction 535.

Port 514 of valve 311 is connected to port 525 of valve 309, a valve 309 including a second port 526, a third port 527, a fourth port 528 connected to the sump, a valve member 529 and a spring 530 that resiliently retains the valve member in a position that port 526 is connected to port 525 and port 527 is connected to port 528. Upon energization of coil 310, port 525 is connected to port 527 and port 526 is connected to port 528. A high pressure reducing valve 533 is connected across port 526 and junction 535 while a low pressure reducing valve 534 is connected across port 527 and junction 535.

The first port 540 of valve 306 is connected to junction 433, valve 306 including a blocked second port 541, a third port 542, a fourth port 543 connected to the sump, and a spring member 545 resiliently retaining valve member 544 in a position that port 540 is fluidly connected to port 541 and port 542 is fluidly connected to port 543. Upon energization of coil 307, valve member 544 moves to a position to connect port 540 to port 542 and port 543 to port 541. Hydraulic motor 96 and a needle valve 547 are connected in series across port 542 and the sump, the hydraulic motor being in intermediate the needle valve and port 542.

Referring to FIGS. 3 and 13, the mechanism for moving limit switches 380, 381 and 410 to their closed positions includes an upright 554 mounted on base 36, upright 554 rotatably mounting a shaft 553 parallel to shaft 39. Intermeshing gears 551, 552 are keyed on shafts 39, 53, respectively, while a drum 555 is mounted on shaft 553 to rotate therewith. The drum has axially spaced, circumferential strips 556, 557 and 558 for respectively operating limit switches 380, 381 and 410 to closed positions. The circumferential length of the cam surface portions of strips 556, 557 and 558 in cooperation with the gear ratios between gears 551 and 552 is such that the respective one of the limit switches 380, 382 and 410 will be retained in the closed position for slightly more than two revolutions of the shaft 39. Further the cam surface portion of strips 556, 557 and 558 are angularly spaced approximately 120° relative to one another on the circumferential surface of the drum.

For purposes of facilitating the description of this invention, the apparatus of this invention is usable for welding a pin 561 having a threaded end portion to one end of a rod portion and a box 562 having an internal threaded portion to the opposite end of a second rod portion. The pin and box are separately formed and then threaded together, the pin and box in a threaded together condition preferably having opposed tapered end surfaces remote from their threaded ends that extend radially inwardly and axially away from the threaded portion, and thence axially inwardly. Each end of the rod portions preferably are provided with tapered annular surfaces 566, 567 that are tapered radially inwardly and axially away from the opposite end of the respective rod portions. The structure of a completed drill stem rod is more fully described in the copending application entitled "Composite Rods" mentioned above.

Upon depressing switch 176 to a closed position, relay 180 moves its switch members 186, 189 to closed positions whereby a hold in circuit is provided through switch member 186 to retain coil 179 energized even though switch 176 resiliently returns to its open position. This provides for the hydraulic pump being energized, whereupon pushing switch 222, relay 229 is energized to energize motor 427 and provide a hold in circuit to maintain the motor energized. As a result, fluid under pressure is applied to line Z and through valve 350 to the lower ends of the cylinders 70 for pivoting the rod hold down assembly from the solid line position of FIG. 4 to the dotted line position.

Now a first drill stem rod portion 563 is placed on the cradle assembly with one end portion adjacent the live center member 40 with said live center in the solid line position of FIG. 3. At this time, the other end of rod portion 563 as viewed in FIGS. 1 and 2 is to the left of the linear travel assembly 14. A pin and box combination 561, 562 that are threaded together are placed on the roller subassembly T with one end of the combination facing rod portion 563 while a second rod portion 564 is placed on the cradle assembly to have its ends as viewed in FIG. 2 to the right of the threaded pin and box combination of 561, 562. In this connection, it is assumed that the rod positioner assembly is in the position illustrated in FIG. 1, that the chuck travel assembly is to the opposite end of its path of longitudinal reciprocation from the position illustrated in FIG. 1, and that the piston rod of the linear travel assembly is in its retracted position whereby a rod portion supported on the cradle assembly may be freely axially moved between rollers 106 and 98.

Further, it will be assumed that at the time motor 427 was energized, that valve 273 is in the position indicated in FIG. 13, and as a result, the application of fluid under pressure to line Z results in fluid under pressure being applied to the control port 480 whereby valve member 485 moves to the position of FIG. 13 to block the application of fluid under pressure to the hydraulic motor 144; and also fluid under pressure is applied to the chuck cylinder 148 whereby it results in the chuck hood being moved to a position that the chuck jaws are in a non-clamping position. Thence switch member 191 is moved to its closed position and remains in its closed condition until moved to its open position.

With switch 191 in its closed position, switch 333 is closed sufficiently long to energize coil 334 of valve 302, switch 333 then returning to an open position. This results in valve member 438 moving to a position that fluid under pressure is applied to port 442 of cylinder 46. The resulting movement of the piston rod 45 in the direction of arrow 570 moves the rod positioner live center member 40 in the same direction and thereby rod portion 563 toward the chuck assembly. Member 40 has a minor base of a diameter smaller than the inner diameter of rod portion 563 to be partially extendable into portion 563 to aid in longitudinally aligning members 561–564. Operator 444 in moving in the direction of arrow 570 moves limit switch 331 to a closed position and retains it in a closed position for a sufficient period of time that relay coil 267 is energized and moves its switch member 265 to form a hold in circuit prior to switch member 266 opening and to energize coil 332 of valve 273 to move valve member 464 to form a fluid connection between ports 460, 461 (Provided the valve member is not already in this position), whereby the chuck jaws are in a non-clamping position as previously indicated. After this occurs, operator 444 is moved away from switch member 331 to permit it to open.

Further, at the same time coil of relay 260 is energized, coil 271 of valve 270 is also energized. As a result valve member 502 moves to apply fluid under pressure to port 508 whereby piston rod 119 moves the chuck travel assembly in the direction of the arrow 155. This movement of the chuck travel assembly moves the chuck relative rod portion 564 so that the rod portion extends thereinto, and upon the live center member 140 abutting against rod portion 564, move said rod portion in the direction of the arrow 155. In this connection the minor base of member 140 is of a smaller diameter than the inside diameter of rod portion 564 to extend partially thereinto to aid in axially aligning members 561–564. The movement of the rod positioner assembly and the chuck travel assembly toward one another is controlled such that rod portions 563, 564 abut against opposite ends of the pin and box combination to properly longitudinally center the combination on the cradle assembly for the welding operation described hereinafter.

As the rod positioner and chuck travel assemblies are moved toward one another, operator 444 closes switch member 342 for a sufficient duration that relay 345 is energized and moves its switch member 349 to retain said relay in an energized condition after switch member 342 moves to an open condition. At the same time the relay 345 is energized, valve 350 is energized to move valve member 457 to a position that fluid under pressure is applied through the upper ports 455 of cylinders 70 to pivot the rod hold down assembly from the dotted line position of FIG. 4 toward its solid line position. The rate of movement of the rod hold down frame about pivots 63 in the direction of the arrow 571 is controlled such that switch 342 moves to an open position and the rod positioner and chuck travel assemblies are moved for retaining rod portions 553, 564 and the pin and box combination in compression in axial alignment with one another just prior to the rod hold down rollers 78 holding the rod portions against the cradle assembly. Since motor 85 is being continuously driven, rollers 78 now rotate rod members 561–564 and therethrough live center members 40, 140.

Just as the rollers 78 move to positions to clampingly hold the rod portions against the cradle assembly rollers, operator 456 moves switch member 361 to a closed position, and retains it in a closed position until the rollers are elevated, this actuating circuitry in the welder machine that per se does not form a part of this invention, and accordingly, the operation of the welder machine will not be described in enough detail to understand the functioning thereof to carry out the welding steps. Upon closing of switch 361, the internal circuitry (not shown) of the controls of the seam locator unit 572 moves its carriage 591 along track 592 and its probe 572a relative the carriage (the probe being mounted on the carriage) to sense the presence of the groove of the rod portion 563, pin 561. The welder head 590 is mounted on the carriage to move therewith. Upon the probe being adjacent the last mentioned groove, the movement of the carriage is stopped, the electrode 572b of the welder head now being positioned for heating the portions of the rod portion 563 and pin 561 at the groove, and the weld rod feed 532c is properly positioned to be fed to commence the welding operation.

As members 561–564 are being rotated (it being noted that live center members 40 and 140 are free to rotate while retaining members 561–564 in axial compression), drum 555 is rotated relative switches 380, 381, 410. Once the welder head 590 is correctly positioned for welding the pin and rod portion 563 together at the groove, all the relays 355, 356 are closed, and upon closure of one of the limit switches 380, 381, 410, the welding step begins. In this connection, it is to be noted that the limit switches have been provided in order that the rod portions 563, 564 have to be rotated a maximum of about 120° after the welder head 572 is properly positioned to commence the welding operation. Assuming that limit switch 380 is the first one closed after the completion of all the relays 355, 356, the closing of the switch 380 results in coil 408 being energized. The energization of coil 408 opens switch members 405, 406 to prevent relays 366, 379 being energized and moves switch member 407 to energize welder circuitry of the welder machine 362. The energization of welder 362 results in power being applied at electrode 572b of the welder head and the weld rod feed 572c for welding the rod portion 563 and pin 361 together at groove 566. It is to be mentioned that preferably an atmosphere of argon or helium or mixture thereof surrounds the location of the welding of pin 561 to rod portion 563. The welding continues for 2° or 3° beyond two complete revolutions of rod portions 563 whereupon the drum 555 has rotated so that switch member 380 opens to de-energize the controls of welder machine 362, the de-energization of the welder machine controls completing the actuation of controls (not shown) of the seam locator unit to move the welder head in the direction of the arrow 570 and extend probe 572a to sense the location of the groove formed in part by surface 567. Once the welder head is properly positioned for welding the box and rod portion 564 together at groove 567, the longitudinal movement of the carriage and the welder head is stopped, the probe 572a withdrawn and relay members 355, 356 are all closed so that upon the closing of one of the limit switches 380, 381 and 410, the welder machine 362 is again energized for welding the box and rod portion 564 together in the manner described with reference to welding the rod portion 563 and 561 together. At the end of the just over two complete revolutions of rod portion 563, the one of relays 366, 398 and 379 that completed the circuit for actuating control 362 is de-energized through the opening of the respective limit switch to stop the welding operation; and the stopping of the welding operation resulting in the seam locator carriage 591 moving to open limit switch 340 for a short time prior to the carriage automatically being moved in the direction opposite arrow 570 to its datum position. In this connection, it is to be noted that the completion of the welding step, one of the relays 355, 356 opens as a result of the deenergization of control 362.

At the time the welding at each of the grooves is complete, through appropriate circuitry, gas is applied at nozzles 575 and ignited by pilots 574 to carry out a post heat operation of the welds.

Limit switch 340 is retained in an open condition for a long enough period to de-energize relay 345 (switch member 349 opening to break the hold in circuit). This regults in coil 351 being de-energized and as a result valve member 457 is resiliently moved to a position to apply fluid under pressure to the lower ends of cylinders 70. This pivots the rod hold down subframe in the direction of the opposite arrow 571, the initial movement of operator 456 permitting limit switch 361 moving to an open condition. Further the initial movement of the rod hold down assembly from its rod hold down position results in the rollers 78 moving out of engagement with the drill stem rod portions and thereby the rotation of the drill stem rod portions is discontinued.

As operator 456 moves further upwardly, it engages limit switch 257 to move it to a closed position and retain it in a closed position for a sufficient time that coil 274 is energized to move valve member 464 to fluidly connect port 461 to port 463. This results in operation of the chuck for moving the chuck jaws 152 into a clamping position with rod portion 564, and also results in discontinuance of application of fluid under pressure at control port 480.

The discontinuance of fluid under pressure at port 480 results in valve member 485 moving to fluidly connect port 481 to port 482 and thereby apply fluid under pressure to hydraulic motor 144, and therethrough to port 470 of cylinder 469. This results in motor 144, through gears 143, 142, rotating the chuck body 151, the chuck hood 150 and the chuck jaws 152 to rotate rod portion 564 in an unthreading direction relative to rod portion 563 (i.e., to unthread the pin and box).

Prior to the start of the rotation of chuck members 150–152, the rod hold down assembly operator 456 has moved to a position to move switch member 254 of switch 236 to break the electrical connection between terminal 251, 252 and electrically connect terminal 251 to terminal 253. This movement of switch member 254 de-energizes relay 260 to break its hold in circuit and de-energize coil 271 of relay 270. The deenergization of coil 271 results in the spring 503 moving valve member 502 to its first position whereby ports 499 and 500 are fluidly connected to the sump. Thus the chuck assembly 133 is free to move in either longitudinal direction along the guide rods, in a "float" condition.

The movement of the switch member 254 to electrically connect terminals 251, 253 results in relay 284 being energized, switch member 293 closing to form a hold in circuit, switch member 295 opening to prevent energization of valves 306, 309; and switch member 294 closing to energize coil 312 of valve 311. Thence operator 456 moves out of engagement with switch 236 whereupon the connection between terminals 251, 253 is broken and the connection between terminals 251, 252 is closed. At the same time relay 284 is energized, solenoid coil 303 of valve 302 is energized. The energization of coil 303 results in valve member 438 moving to a position to fluidly connect port 434 to port 435 and port 436 to port 437. As a result the piston rod 45 of the rod positioner assembly moves in the direction of the arrow 155 to move the rod positioner assembly to its datum position.

The aforementioned energization relay 284 energizes valve 311 to move valve member 516 to a position that port 512 is connected to port 514 and port 513 to port 515 to provide a fluid under pressure through pressure reducing valve 533 to port 520 of cylinder 102. This moves roller 106 upwardly with sufficiently high pressure to clamp rod portion 563 between rollers 98, 106 to prevent rotation and axial movement of rod portion 563.

With rod portion 563 being clamped by rollers 98, 106 to prevent rotation thereof, and rod portion 564 being clamped by the chuck jaw to rotate therewith, the rotation of the chuck results in the box 562 being angularly and axially moved in an unthreading direction to disconnect the box from the pin. Due to rod portion 563 being held in its fixed axial position, the unthreading movement of the box results in the chuck assembly being moved in the direction of arrow 570 along the guide rods 120.

The number of rotations of the motor shaft of motor 144 is controlled due to fluid under pressure passing through the motor passing through port 470 to move the piston rod 473 from its retracted position towards its fully extended position. That is, after sufficient fluid has passed through the motor to turn it the proper number of revolutions, the piston rod 473 has moved its operator into engagement with limit switch 276. This moves switch member 280 to break the electrical connection between terminals 277, 278 and provide an electrical connection between terminals 277, 279. Electrically connecting terminals 277, 279 energizes relay 315 and coil 272 of valve 270 while the breaking of electrical connection between terminals 277, 278 results in relay 284 being de-energized and coil 303 of valve 302 being de-energized. The energization of coil 272 results in port 498 being connected to port 499 and port 500 to port 501 whereby fluid under pressure is applied to cylinder port 507 to move piston rod 119 in the direction of the arrow 570. This axially moves the chuck travel assembly in the direction of the arrow 570 and the rod portion 564 and box 562 in the same axial direction.

The energization of relay 315 results in switch member 323 moving to block energization of coil 332 until either limit switch 330 or 331 is closed (as long as relay 315 is energized) and switch member 322 moving to a closed position to, in conjunction with limit switch 325, provide a hold in circuit for maintaining relay 315 energized. The de-energization of relay 284 results in switch members 293, 294 moving to open positions whereby valve 311 is de-energized and valve member 516 resiliently moves to apply fluid under pressure to the upper port 519 of cylinder 102. As a result, roller 106 is moved downwardly out of engagement with rod portion 563. Further, the de-energization of relay 284 results in coil 303 of valve 302 being de-energized.

After chuck assembly is moved a short distance in the direction of arrow 570 from its float position, the operator 506 closes limit switch 330 to energize coil 332 of valve 273 to move its valve member to a position so that fluid under pressure is applied to the chuck cylinder 148 and operates the chuck to a chuck jaw release position. Further movement of the chuck assembly results in the chuck live center member 140 being moved away from the adjacent end of rod portion 564. At the same time fluid under pressure is applied to the chuck cylinder 148, fluid under pressure is applied to control port 480 to move valve member 485 to connect port 482 to port 484; and fluid under pressure is applied at port 469 to move piston rod 473 in the direction of the arrow 570. The movement of piston rod 473 in the direction of the arrow 570 moves operator 474 away from limit switch 276. As a result, switch member 280 of the limit switch breaks the electrical connection between terminals 277, 279 and establishes an electrical connection between terminals 277, 278, it being noted that relay 284 is de-energized at this time and relay 315 remains energized through its hold in circuit.

As the piston rod 119 of the chuck travel assembly continues to move in the direction of the arrow 570, operator 506 is moved into engagement with limit switch 325 to open said limit switch, limit switch 325 opening after the switch member 280 has returned to a position to electrically connect terminals 277, 278. As a result, the hold in circuit for relay 315 is broken to de-energize the relay and coil 272 of valve 270 whereupon ports 499, 500 are connected to port 501. Prior to the discontinuation of the application of fluid under pressure at port 507, the operator 506 is moved sufficiently to permit limit switch 325 closing. At this time, the chuck travel assembly piston rod is in its fully extended position whereby the right hand end of rod portion 564 as viewed in FIGS. 1 and 2 is to the left of the chuck.

Now the rod portion 564 with the box 562 welded thereto is removed from the cradle assembly, and thereafter switch 239 is manually operated to move switch member 242 to electrically connect terminals 238, 240 and switch member 247 to electrically connect terminals 245, 246. This completes a circuit for energizing relay 260 and coil 271 of valve 270. The energization of relay 260 provides the hold in circuit bypassing switch member 242 while the energization of coil 271 moves valve member 502 that the chuck is moved in the direction of arrow 155.

The moving of switch member 247 to connect terminals 246, 245 provides a circuit to energize coils 307, 310, 312 of valves 306, 309 and 311, respectively. With both valves 309, 311 energized, the valve members are moved to apply fluid under pressure through ports 525, 527 through the low pressure reducing valve 534 and thence to the lower port 520 of cylinder 102. As a result, roller 104 is moved upwardly with sufficient pressure to hold rod portion 563 in driven abutting relationship with roller 98 while not blocking axial movement of the rod portion 563.

The energization of valve 306 applies fluid under pressure to hydraulic motor 96 to drive a shaft 95 and thereby roller 98 in the direction to act in cooperation with roller 106 to move rod portion 563 in the direction of the arrow 570 until the left hand end portion of said port as viewed in FIG. 2 moves to the left of the vertical plane between the axis of rollers 106, 98. At this time the switch 239 is operated to break the electrical connection between terminals 245, 246 whereupon valves 309, 306 and 311 are de-energized and thence rod portion 563 further manually moved in the direction of the arrow 570 to the right of roller assembly T as viewed in FIG. 2, and thereafter, a second pin and box combination placed on roller assembly T. Thence a second rod portion 563 is positioned on the cradle assembly to be longitudinally intermediate the live center member of the rod positioner and the linear travel assembly 14. Now the second rod portion 563, the second pin and box combination 561, 562 and the first rod portion 563 which now has a pin welded on its end adjacent the chuck are generally longitudinally aligned on the cradle assembly. Thence button 330 is moved to a closed position for a sufficient time to energize coil 334 of valve 302; this applying fluid under pressure to the end of the rod position cylinder 46 whereby the piston rod 45 is moved in the direction of the arrow 570. The cycle of operation is the same as previously described other than that relay 260 has already been energized through the previously described operations of switch 239 and remains in an energized condition through its hold in circuit even though switch member 242 has broken the electrical connection between terminals 238, 240. Thus, at this time, the closing of limit switch 331 energizes coil 332 of valve 273 which was not previously energized since relay switch member 266 had opened prior to the energization of said coil. Thereafter the cycle of operation is the same, it being noted that upon the completion of the cycle to the point that the second rod portion 563 is removed from the cradle assembly, the second rod portion has a box welded on one end and a pin welded on the opposite end thereof.

To be mentioned is that each of the limit switches 236, 257, 276, 325, 330, 331, 361, 340 and 342 are of the type that they are moved from the positions they are resiliently retained in only when the operators are moved in the above described indicated direction and not in the opposite direction.

By using the apparatus of this invention, the pins and boxes may be readily made at one location or country and thence shipped to another location or country to be welded to rod portions to form drill rods. In this connection, it is to be noted that in making the pin and box, more precise manufacturing operations have to be carried out than in making the rod portions, and that it is preferable to use a higher quality steel for the pin and box than the rod portions and the higher steel may not be made at the location or country where the drill rod is to be made. Thus, the lower quality steel rod blanks, which form the major part of the drill rod, and is satisfactory for the rod portion, may be used without having to ship the rod portions long distances.

During the welding steps, each of pin 561 and rod portion 563, and box 562 and rod portion 564 are joined together by an external circumferential weld bead 580 filling the respective groove and an internal annular weld bead 481 such as indicated in FIG. 11 for the box and rod portion 564, the rod portions being fused throughout to the pin and box, respectively, at the abutting tapered surfaces intermediate beads 480, 481.

A suitable seam locator unit 572 for use in this invention is sold under the trade designation "Special Seam Locator," Model CMS-9A, by Cecil Equipment Co., Cleveland, Ohio. A suitable welding machine 362 for use in this invention is sold under the trade designation "Contour Welder," Model HWM3, Linde Co., a division of Union Carbide Corp.

What is claimed is:

1. Rod welding apparatus for welding a first, a second and a third rod member together, each rod member having a central axis, comprising a longitudinally elongated frame having a first end portion, a second end portion and an intermediate portion, first means mounted on the frame intermediate portion for supporting the rod members in axial alignment with the second rod member intermediate the first and third rod members, second means mounted on the frame second portion to abut against the third rod member to limit axial movement of the rod members on the first means in a longitudinal direction from the first end portion toward the second end portion, third means mounted on the frame for cooperating with the second means to releasably retain the three rod members in axial alignment on the first means in axial compression and rotate the rod members about their axes while being retained in axial compression, and fourth means for welding the adjacent ends of the first and second rod members together and the adjacent ends of the second and third rod members together while the rod members are being rotated by the third means, the first means comprising a plurality of longitudinally spaced roller assemblies mounted on the frame intermediate portion, each roller assembly having a pair of rollers, and means to rotate the pair of rollers with the rollers having transversely spaced, longitudinal axes of rotation, and that the third means includes a longitudinally elongated shaft, a plurality of longitudinally spaced rollers mounted on said shaft, and fifth means mounted on the frame intermediate portion for mounting the shaft and moving the shaft between a first position that the third means rollers are substantially spaced from the roller assemblies and a second position that the third means rollers abut against two of the aligned rod members to rotatably retain the rod members in axial alignment on the roller assemblies.

2. Rod welding apparatus for welding a first, a second and a third rod member together, each rod member having a central axis, comprising a longitudinally elongated frame having a first end portion, a second end portion and an intermediate portion, first means mounted on the frame intermediate portion for supporting the rod members in axial alignment with the second rod member intermediate the first and third rod members, second means mounted on the frame second portion to abut against the third rod member to limit axial movement of the rod members on the first means in a longitudinal direction from the first end portion toward the second end portion, third means mounted on the frame for cooperating with the second means to releasably retain the three rod members in axial alignment on the first means in axial compression and rotate the rod members about their axes while being retained in axial compression, and fourth means for welding the adjacent ends of the first and second rod members together and the adjacent ends of the second and third rod members together while the rod members are being rotated by the third means, each of the second and third means including a live center member abuttable against the remote ends of the first and third rod members, means for rotatably mounting the respective live center members and means mounted on the frame for longitudinally reciprocating at least one of the live center member mounting means a limited distance.

3. The apparatus of claim 1 further characterized in that each of the second and third means includes a live center member abuttable against the remote ends of the first and third rod members, means for rotatably mounting the respective live center members and means mounted on the frame for longitudinally reciprocating the respective live center member mounting means a limited distance.

4. The apparatus of claim 3 further characterized in that the second rod member comprises a threaded together pin and box combination, that the abutting ends of the first and second rod members and the second and third rod members respectively have matching tapered surface portions abutting against one another when the rod members are being retained in axial compression, that the second means includes a hydraulic chuck assembly having a longitudinal opening extending therethrough to open to second means live center member, chuck jaws movable between a rod member clamping position and a rod release position and a chuck body for mounting the jaws for movement between their positions, that the second means live center member mounting means includes rotatable sixth means for mounting the live center member for rotation relative thereto and the chuck body to rotate therewith, and seventh means for drivingly rotating the sixth means.

5. The apparatus of claim 4 in that there is provided operable eighth means for clampingly holding the first rod member against rotation and control means to operate the eighth means to clampingly hold the first rod portion, the chuck jaws to their rod clamping position to clampingly hold the third rod portion and thence the seventh means to rotate the sixth means in a direction to unthread the pin from the box after the adjacent ends of the second rod member have been welded to the first and third rod members respectively.

6. Rod welding apparatus for welding a first, a second and a third rod member together, each rod member having a central axis, comprising a longitudinally elongated frame having a first end portion, a second end portion and an intermediate portion, first means mounted on the frame intermediate portion operable between a first condition for supporting the rod members in axial alignment with the second rod member intermediate the first and third rod members and a second condition rotating the rod members and holding at least one of the rod members against transverse and lateral movement, second and third means respectively mounted on the first end portion and the second end portion for cooperatively holding the rod portions on the first means in the first condition in axial compression and retaining the rod members in axial compression while permitting the rod members to rotate when the first means is in its second condition, the second means being abuttable against the first rod member end that is remote from the second rod member and the third means being abuttable against the third rod member end that is remote from the second rod member, fourth means mounted on the frame first end portion for mounting the second means for limited longitudinal movement toward and away from the third means, fifth means for mounting the third means on the frame second end portion and welder means for welding the adjacent ends of the first and second rod members and the adjacent ends of the second and third rod members.

7. The apparatus of claim 6 further characterized in that each of the second and third means includes a live center member abuttable against the end of the first and third rod members respectively that is adjacent thereto and means for mounting the respective live center member for rotation about coextensive longitudinal axes.

8. The apparatus of claim 7 further characterized in that the first means includes a cradle assembly for supporting the rod members in longitudinal alignment for rotation about a common longitudinal axis and a rod hold down assembly mounted on the frame for movement between a rod hold down position and a datum position more remotely spaced from the cradle assembly than the rod hold down position.

9. Rod welding apparatus for welding the first end of a first axially elongated rod portion to a first end of a second axially elongated rod portion, each of said rod portions having a second end, comprising a longitudinally elongated frame having a first end portion, an intermediate portion and a second end portion, a cradle assembly mounted on the frame for supporting the rod portions in longitudinally extending, axially aligned relationship with the first rod portion extending adjacent the first end portion and the second rod portion extending adjacent the second end portion, a chuck assembly mounted on the second end portion for engaging the adjacent end portion of the second rod portion to retain the second rod portion against movement in a longitudinal direction from the first end portion toward the second end portion for a first interval of time when permitting rotation of the second rod portion about a longitudinal axis of the rod portions supported on the cradle assembly, a rod positioner assembly mounted on the first end portion for longitudinal movement between a datum first position and a second position abutting against the second end of the first rod portion to retain the first end of the first rod portion against the first end of the second rod portion that is remote from the chuck assembly when the second rod portion is engaged thereby, a hold down assembly for holding the rod portions in fixed transverse positions on the cradle assembly while permitting rotation of the rod portions about said longitudinal axis, said hold down assembly being mounted on the intermediate portion for movement between a datum first position and a rod hold down position, and including first means for rotating the rod portions about the longitudinal axis when the rod hold down assembly is in its rod hold down position, and welding means for welding the rod portions to join said rod portions first ends together as the rod portions are being rotated by the first means and the rod portions extend on the cradle assembly between the rod positioner assembly in its second position and the chuck assembly and the second rod portion abuts against the chuck assembly during said first interval of time.

10. The apparatus of claim 9 further characterized in that the chuck assembly has a live center member to abut against the second rod portion second end while the rod portions are being held against the cradle assembly by the rod hold down assembly in its rod hold down position, and second means for mounting the live center member on the frame for rotation about said longitudinal axis.

11. The apparatus of claim 10 wherein one of the rod portions includes separately threaded pin and box members, further characterized in that there is provided third means on the frame operable between a first position for clampingly engaging the first rod portion that abuts against the rod positioner assembly to block rotation of the first rod portion and a second position permitting rotation of the first rod portion, that the second means includes fourth means for mounting the live center member for rotation about said longitudinal axis, a housing, fifth means rotatably mounting the fourth means in a longitudinally fixed position in the housing, said fifth means being rotatably mounted by the housing, sixth means mounting the housing for longitudinal movement on the frame, said fifth means including seventh means for releasably clampingly holding the adjacent end of the second rod portion, and eighth means for drivingly rotating the fifth means, including the seventh means, about the longitudinal axis, and that there is provided control means for actuating the seventh means to clampingly hold the second rod portion, and the eighth means to rotate the fifth means for a selected interval when the seventh means clampingly holds the second rod portion and operate the third means to its first position before the eighth means rotates the fifth means and after the selected interval operate the third means to its second position.

12. The apparatus of claim 11 further characterized in that there is provided operable ninth means on the frame for longitudinally moving the sixth means between a first position remote from the first end portion and a second position more closely adjacent the first end portion and that the control means includes means for actuating the ninth means to move the sixth means between its positions and to permit floating longitudinal movement of the sixth means when the seventh means clampingly holds the adjacent end of the second rod portion.

13. The apparatus of claim 11 further characterized in that the third means includes a first roller, a second roller, ninth means for mounting said rollers for rotation about transverse axes sufficiently spaced to have the first rod portion on the cradle assembly extend therebetween the relatively move said rollers between a spaced apart non-clamping first position and a rod clamping second position to block rotation of the first rod portion clamped thereby, a third portion to move the first rod portion axially toward the second end portion, and tenth means for drivingly rotating at least one of the rollers in a direction to move the first rod portion toward the frame second end portion, and that the control means includes means for actuating the tenth means when the rod hold down assembly is in its first position.

14. The apparatus of claim 11 further characterized in that the rod positioner assembly includes a live center member abuttable against the first rod portion second end, ninth means for mounting the live center member for rotation about said longitudinally axis in a fixed longitudinal position relative thereto, and tenth means mounted on the frame for moving the ninth means longitudinally between said rod positioner assembly first and second positions.

15. The apparatus of claim 14 wherein the first rod portion is tubular and has a frusto conical surface at its second end that is tapered radially outwardly toward its first end and that the live center member has a frusto conical surface partially extendable into the first rod portion second end to aid in properly aligning the first rod portion relative said longitudinal axis.

16. The apparatus of claim 11 further characterized in that the cradle assembly includes a plurality of rollers assemblies mounted on the frame intermediate portion in longitudinally spaced relationship for supporting the rod portions in longitudinal alignment, each roller assembly including a first roller, a second roller and ninth means for mounting the rollers longitudinally offset from one another for rotation about longitudinal axes that are sufficiently spaced to provide a nip to support the adjacent part of the respective rod portion.

17. The apparatus of claim 16 further characterized in that the rod hold down assembly includes a longitudinally elongated shaft, a subframe mounting said shaft for rotation about a longitudinal axis, said subframe being mounted on the frame intermediate portion for movement between a datum first position and a second position that the shaft is directly above roller assembly nips and more closely adjacent the roller assemblies than the last mentioned first position, a plurality of hold down rollers keyed on said shaft in longitudinal spaced relationship for abutting against rod portions on the cradle assembly when the subframe is in its second position, means connected to said shaft for driving said shaft, and means mounted on the frame for moving the subframe between its positions.

18. The apparatus of claim 17 further characterized in that the rod hold down assembly includes roller means mounted on the subframe for bearing against the hold down rollers generally on the opposite side of the roller means from the rod portions on the cradle assembly when the subframe is in its second position, and that there is provided one of said roller assemblies for each of the hold down rollers that is vertical below the respective hold down roller when the subframe is in its second position.

19. The apparatus of claim 16 wherein the second rod portion comprises a pin and a box having matching thread portions and opposite end portions, one of said opposite end portions having said second rod portion first end and an elongated third rod portion, that one of said roller assemblies comprises a plurality of said first rollers and a plurality of second rollers and that the ninth means includes a base, means for mounting the base on the frame and resiliently urging the base upwardly to a datum position and means for mounting said plurality of first and second rollers on the base, said one roller assembly being provided for supporting the pin and box in a threaded connected position intermediate the first and third rod portions.

20. The apparatus of claim 19 further characterized in that the third means is mounted on the frame longitudinally intermediate the rod positioner assembly and the said one roller assembly, that the third means includes a driver roller abuttable against the first rod portion, eleventh means on the frame movable between a datum position and a second position to hold the first rod portion in driven relationship to the drive roller, and twelfth means for driving the driven roller in a direction to move the first rod portion toward the second end portion, and that the control means includes means for actuating the twelfth means to drive the drive roller and the eleventh means to its second position when the third means is in its first position.

21. The apparatus of claim 11 further characterized in that there is provided ninth means on the frame intermediate portion for clampingly holding the first rod portion at a location remote from the rod positioner assembly at the time the first rod portion abuts against the rod positioner assembly to prevent longitudinal movement thereof and alternately moving the first rod portion longitudinally toward the frame second end portion.

22. The apparatus of claim 21 further characterized in that the ninth means includes a pair of rollers, tenth means for mounting the rollers on circumferentially opposite sides of the first rod portion when the first rod portion abuts against the rod positioner assembly, tenth means mounting said rollers for rotation about transverse axes, and operable eleventh means for driving at least one of said rollers in a direction to move the first rod portion toward the second end portion.

23. The apparatus of claim 22 further characterized in that the tenth means includes twelfth means for moving the rollers relative one another between a datum spread apart position freely permitting the first rod portion being moved longitudinally therebetween, a second position to drivingly engage the first rod portion to move it longitudinally when the eleventh means is operated, and a third position to clampingly hold the first rod portion against rotation about said longitudinal axis.

24. The apparatus of claim 23 further characterized in that the control means includes means for operating the rod positioner assembly toward the chuck assembly while maintaining the twelfth means in its first position, automatically operate the twelfth means from its first position to its third position after the rod portions have been welded together and thereafter operate the twelfth means to its second position and operate the eleventh means.

25. The apparatus of claim 24 wherein the second rod portion has a threadedly coupled pin and box adjacent its first end, further characterized in that the control means includes means to operate the seventh means to its clamping position and the eighth means to drive the fifth and seventh means when the twelfth means is in its third position to separate the threaded connection between the pin and box.

26. The apparatus of claim 23 further characterized in that there is provided operable thirteenth means for moving the sixth means between a first position remote from the rod positioner assembly and a second position more closely adjacent the rod positioner assembly and that the control means includes means for operating the thirteenth means to move the sixth means towards its first position prior to the rod portions being welded, to permit free floating longitudinal movement of the sixth means when the pin and box are being separated as mentioned above, and after the separation, move the sixth means toward its second position while retaining the seventh means in its clamping position.

27. Rod welding apparatus for welding the first end of a threaded pin and box combination to the first end of a first rod portion and the opposite second end of said combination to the first end of a second rod portion, each rod portion having an opposite second end, comprising a longitudinally elongated frame having a first end portion, an intermediate portion and a second end portion, first, second and third means mounted on the frame for supporting the first rod portion, said combination and the second rod portion respectively for rotation about a common longitudinal axis with said combination between the rod portions first ends, a chuck assembly mounted on the second end portion for abutting against the second rod portion adjacent its second end to block movement of the second rod portion in a longitudinal direction away from the first end portion, a rod positioner assembly mounted on the first end portion for abutting against the first rod portion adjacent its first end to act in cooperation with the chuck assembly for releasably retaining the combination and rod portions in compression, fourth means mounted on the frame for cooperating with the above mentioned means for retaining the combination and the rod portions in abutting compression relationship, and fifth means for welding the first rod portion first end to the combination first end and the second rod portion first end to the combination second end.

28. The apparatus of claim 27 further characterized in that the rod positioner assembly includes means rotatable about the longitudinal axis for abutting against the first rod portion second end, that the fourth means includes a chuck assembly having sixth means rotatable about the longitudinal axis for abutting against the second rod portion adjacent its second end, and that there is provided seventh means for abutting against the rod portions to act in cooperation with the first and third means to retain the rod portions in axial alignment and rotate said rod portions when the rod portions are being welded to said combination.

29. The apparatus of claim 27 further characterized in that there is provided sixth means on the frame for clampingly holding the first rod portion against rotation about the longitudinal axis after said rod portions have been welded to said combination and that the fourth means includes rotatable seventh means for clampingly engaging the second rod portion to rotate after the rod portions have been welded to the combination and eighth means mounted on the frame for rotating the seventh means in a direction to disconnect the pin and box threaded connection and mount the seventh means on the frame for longitudinal movement relative the rod positioner assembly in a direction away from the rod positioner assembly as the seventh means is rotated.

30. The apparatus of claim 29 further characterized in that the eighth means includes a chuck member for clampingly engaging the second rod portion, a base, ninth means mounting the chuck member on the base in a fixed longitudinal position relative the base and mounting the chuck member for rotation relative the base, tenth means connected to the chuck member to rotate the chuck member to threadedly disconnect the pin and box, and means for mounting the base on the frame for longitudinal movement.

31. The apparatus of claim 30 further characterized in that there is provided operable means for moving the base between a first position and a second position more longitudinally remote from the rod positioner assembly than the last mentioned first position and control means for operating said operable means to a float condition intermediate the operable means first and second positions after the rod portions have been welded to the combination and retain the float condition while the pin and box are being threadedly disconnected and thereafter operate the operable means toward its second position while the chuck member clampingly engages the second rod portion to more remotely space the pin and box.

32. Rod welding apparatus for welding the first end of a first axially elongated rod portion to a first end of a second axially elongated rod portion, each of said rod portions having a second end, comprising a longitudinally elongated frame having a first end portion, an intermediate portion and a second end portion, rod hold down and cradle assembly means mounted on the frame and operable between a first condition for supporting the rod portions in longitudinally extending, axially aligned relationship and a second condition for holding the rod portions in fixed transverse positions and rotating the rod portions in axial alignment about their longitudinal axes, said hold down and cradle assembly means including a cradle assembly mounted on the frame for supporting the rod portions in longitudinally extending, axially aligned relationship with the first rod portion extending adjacent the first end portion and the second rod portion extending adjacent the second end portion, and a hold down assembly for holding the rod portions in fixed transverse positions on the cradle assembly while permitting rotation of the rod portions about said longitudinal axes, said hold down assembly being mounted on the intermediate portion for movement between a datum first position out of engagement with the rod portions on the cradle assembly and a rod hold down second position cooperating with the cradle assembly to hold the rod portions in fixed transverse positions and rotate the rod portions, a chuck assembly mounted on the second end portion for engaging the adjacent end portion of the second rod portion to retain the second rod portion against movement in a longitudinal direction from the first end portion toward the second end portion for a first interval of time when permitting rotation of the second rod portion about a longitudinal axis of the rod portions supported on the cradle assembly, a rod positioner assembly mounted on the first end portion for longitudinal movement between a datum first position and a second position abutting against the second end of the first rod portion to retain the first end of the first rod portion against the first end of the second rod portion that is remote from the chuck assembly when the second rod portion is engaged thereby, and welding means for welding the rod portions to join said rod portions first ends together as the rod portions are being rotated by the hold down and cradle assembly means and the rod portions extend on the cradle assembly between the rod positioner assembly in its second position and the chuck assembly and the second rod portion abuts against the chuck assembly during said first interval of time.

* * * * *